United States Patent Office 3,076,291
Patented Feb. 5, 1963

3,076,291
SEED GERMINATION PROMOTER AND METHOD OF MAKING AND USING SAME
Frank Gardner, 1109 N. 5th St., McAllen, Tex.
No Drawing. Filed Mar. 28, 1960, Ser. No. 17,738
4 Claims. (Cl. 47—58)

This invention relates to the composition of a new and improved seed germination promoter and to the method of using same.

Heretofore, under normal planting conditions, only about 65% of the seeds which were planted actually would sprout or germinate. The seeds which did not sprout or germinate were of course lost, and such seed loss can be quite expensive in large planting operations as well as creating other problems such as spacing of crops and replanting of additional seeds. If additional seeds cannot be planted because of seasonal or weather conditions or for other reasons, the farmer or other planter has lost approximately 35% of the ultimate revenue he might otherwise have obtained from his crop if germination were complete.

It is therefore an important object of this invention to provide a new and improved seed germination promoter whereby the percentage of germination of seeds planted is substantially increased.

Another important object of this invention is to provide a new and improved means of adapting organic materials for effective use as seed germination promoters.

Another object of the present invention is to provide a new and improved composition of organic material and an alkali whereby seed germination is promoted.

A principal object of the present invention is to provide a new and improved composition which can be added to seeds whereby the germination of such seeds can be substantially increased.

Another object of the present invention is to provide a new and improved method which may be employed in promoting the germination of seeds.

Still another object of the present invention is to provide a new and improved germinater which also stimulates the rate of growth of plants and also increases the size of plants.

A preferred embodiment of this invention will be described hereinafter, together with other features thereof, and additional objects, features and advantages of the invention will become evident from such description.

Briefly, this invention relates to a new seed germination promoter or composition and method of using same. As previously explained, normal seed germination has heretofore been about 65%, i.e. if one hundred seeds were properly planted about sixty-five of such seeds would sprout. By using the seed germination promoter of this invention, such seed germination may be increased to about 95-98%. In addition to such increased seed germination, the seed germination promoter or composition of this invention also increases the rate of growth of the seeds so that the sprouts are more quickly produced, and thereafter the plants mature more rapidly and the relative size and quality of the plants are increased.

In preparing the composition of the present invention any organic material such as lignite, brown coal, peat, or other organic material in which the hydrocarbons therein are soluble in alkalies may be used. Lignite is generally preferred as large amounts of alkali soluble hydrocarbons are contained therein and it can be obtained in large quantities at a relatively low cost. A low calorific lignite such as found in the Wilcox and Yegua formations in Texas is particularly useful in the manufacture of the seed germination promoter of this invention. It should be noted that petroleum oils and distillation products of petroleum are undesirable in this invention and the use of such types of organic materials is to be avoided in preparing the composition of this present invention. For the purposes of illustration and simplification, the examples hereinafter set forth especially include lignite as the organic material.

The organic material in the form of lignite is preferably ground or pulverized to pass through a 30 mesh screen which gives a sufficiently fine mass or mash so as to make the alkali soluble hydrocarbons contained in the lignite suitable for rapid and economical solubilizing. An alkali such as ammonium hydroxide, potassium hydroxide or sodium hydroxide is added to the pulverized lignite to form a concentrate. Ammonium hydroxide is normally preferred as it is cheaper, safer to handle and more effective than either potassium or sodium hydroxide. Such concentrate should have one part of the alkali by weight to from about 2 to about 120 parts by weight of lignite or other organic material having hydrocarbons soluble in alkali.

In the preferred use of the composition of this invention as a seed germination promoter, the concentrate thus produced is diluted with water to produce a dilute solution in which the concentrate is presented in an amount by volume from about 5.0% to about .0002%. The liquid is then separated from the solids by decanting, filtering or other suitable means and such seed germination promoter in the diluted form is ready to be applied to plant seeds.

Another form of the seed germination promoter of this invention is prepared by grinding or pulverizing the lignite as explained above and then a strong acid such as sulphuric acid is added to the lignite. The sulphuric acid should be added on the basis of from about 4 to about 7 parts by weight of the lignite to about one part by weight of sulphuric acid. An alkali, preferably either ammonium, sodium or potassium hydroxide, is then added to the compound or mass. The alkali is added on the basis of from about 1.2 to about 3.5 parts by weight of the alkali to about one part by weight of sulphuric acid.

Such alternate embodiment employing the strong acid is used in a diluted solution for a seed germination promoter. When diluted with water the final solution has approximately 0.5% to approximately 0.0001% by volume of the concentrate in the solution. The mass is then decanted, filtered, or otherwise prepared to separate the solids from the liquids. The liquid is afterward applied on the seeds when planting thereby effectively increasing the germination of such seeds.

Some specific examples of the preparation of the seed germination promoter are as follows:

*Using Ammonium Hydroxide*

1360 grams of lignite is ground or pulverized to a minus 30 mesh and 2720 milliliters of a 1% ammonium hydroxide solution is then added to the lignite. Stated in parts by weight, in such example approximately 50 parts by weight of the lignite were added to each part by weight of the ammonium hydroxide. This proportion may vary from approximately 2 to approximately 120 parts by weight of the lignite to each part by weight of the ammonium hydroxide, depending upon the specific amount of soluble organic material in the lignite. The primary solution or mass is then diluted with water so that the concentrate is present in an amount of volume from about 5.0% to .0002%.

*Using Potassium Hydroxide*

100 grams of lignite is ground to a minus 30 mesh and 250 milliliters of 0.1 normal potassium hydroxide is then added to the lignite. This is 1.42 grams of potassium hydroxide to 100 grams of lignite or about 70 parts of lignite to each part of potassium hydroxide. This proportion may be varied from about 40 to about 80 parts by weight of lignite to each part of potassium hydroxide. This primary solution or concentrate is diluted with water so that the concentrate is present in an amount from about .02 to about .0002%.

Using Sodium Hydroxide 100 grams of lignite is ground to a minus 30 mesh and 250 milliliters of 4 grams per liter sodium hydroxide is added. This is one gram of sodium hydroxide to 100 grams of lignite by weight or 100 parts by weight of lignite to each part by weight of sodium hydroxide. This proportion may be varied from about 80 to about 120 parts of lignite to each part of sodium hydroxide. The primary solution or concentrate is then diluted with water so that the concentrate is present in an amount from about .03 to about .004%.

Using Sulphuric Acid and Ammonium Hydroxide 100 grams of lignite is ground to a minus 30 mesh and 178 milliliters of 10% sulphuric acid is added to the lignite. To this compound or mass is added 160 milliliters of 20% ammonium hydroxide. The following table shows the relative parts by weight:

|  | Grams | Parts | Range of Parts |
| --- | --- | --- | --- |
| Lignite | 100.00 | 5.25 | 4.00-7.00 |
| Sulphuric acid | 19.07 | 1.00 | 1.00 |
| Ammonium hydroxide | 34.08 | 1.80 | 1.20-3.50 |

The concentrate is then decanted and diluted with water to approximately 0.5%-0.0001%.

Controlled germination tests were made using seeds of lettuce, rye, muskmelon, carrots and tomatoes. Germination of seeds not only was increased to about 95-98% but rate of growth before and after germination, size of roots, leaves, stem and the quality of plant were increased by about 125%-500%.

Tests were made in glazed dishes of 25 cc. capacity with 3 seeds each. Ordinary tap water was used in making solutions, but evaporation losses were replenished with distilled water. Flats were also used in making these tests, using either vermiculite or perlite as the bed. Tests were also made in the soil. The dish tests were evaluated periodically by combining the root and stem lengths of the seeds to which the germination promoter was added and comparing such lengths with the comparable lengths of the control seeds. In the flats and soil tests the actual number of seeds germinated as well as the growth of the plants after germination were compared with the treated seeds being compared to the untreated or control seeds.

The particular concentration of the promoter as used is varied within the foregoing critical ranges for different types of seeds so as to get the best results for each type of seeds.

It is believed evident from the foregoing examples that a new and useful seed germination promoter, and method of using same, has been provided which has the new and unexpected results of increasing seed germination as described above.

What is claimed is:

1. A method of using a liquid seed germination promoter comprising the step of adding said seed germination promoter to seeds before planting same, wherein said seed germination promoter is formed by mixing about 2 to about 120 parts by weight of an organic material of the type having hydrocarbons soluble in alkali with one part by weight of an alkali thereby forming a liquid concentrate, and diluting said concentrate with water whereby said concentrate is present in said water in an amount by volume of from about 5.0% to about .0002%.

2. A method of manufacturing a liquid seed germination promoter, comprising the step of adding about one part by weight of an alkali selected from the group consisting of ammonium hydroxide, potassium hydroxide and sodium hydroxide to about 2 to about 120 parts by weight of an organic material selected from the group consisting of lignite, peat and brown coal thereby forming a liquid concentrate, and diluting said concentrate with water whereby said concentrate is present in said water in an amount by volume of from about 5.0% to about .0002%.

3. A method of manufacturing and using a liquid seed germination promoter, comprising the steps of adding about one part by weight of sulphuric acid to about four to seven parts by weight of lignite, adding to the product from said first step about 1.2 to about 3.5 parts by weight of ammonium hydroxide to each part of said sulphuric acid previously added thereby forming a liquid concentrated, diluting said concentrate with water whereby said concentrate is present in said water in an amount by volume of from about 5.0% to about .0001%, and applying the liquid from said previous step to seeds before planting said seeds whereby the germination of said seeds is substantially increased.

4. A method of using a liquid seed germination promoter comprising the step of adding said seed germination promoter to seeds at the time of planting same, wherein said seed germination promoter is formed by mixing about 2 to about 120 parts by weight of an organic material of the type having hydrocarbons soluble in alkali with one part by weight of an alkali thereby forming a liquid concentrate, and diluting said concentrate with water whereby said concentrate is present in said water in an amount by volume of from about 5.0% to about .0002%.

References Cited in the file of this patent

UNITED STATES PATENTS

| 838,108 | Hammerschlag | Dec. 11, 1906 |
| 1,221,979 | De Whalley | Apr. 10, 1917 |
| 1,254,366 | Schroeder | Jan. 22, 1918 |
| 2,027,766 | Davis | Jan. 14, 1936 |
| 2,150,164 | Heath | Mar. 14, 1939 |
| 2,735,756 | Farber | Feb. 21, 1956 |
| 2,992,093 | Burdick | July 11, 1961 |

FOREIGN PATENTS

| 711,623 | Great Britain | July 7, 1954 |